(12) United States Patent
Kobayashi et al.

(10) Patent No.: US 9,083,894 B2
(45) Date of Patent: Jul. 14, 2015

(54) PROJECTION TYPE DISPLAY APPARATUS

(75) Inventors: Tomohisa Kobayashi, Yokohoma (JP); Takatsugu Aizaki, Yokohama (JP); Shinji Kikuma, Yokohama (JP)

(73) Assignee: JVC KENWOOD Corporation, Kanagawa (JP)

( * ) Notice: Subject to any disclaimer, the term of this patent is extended or adjusted under 35 U.S.C. 154(b) by 490 days.

(21) Appl. No.: 13/509,441

(22) PCT Filed: Oct. 13, 2011

(86) PCT No.: PCT/JP2011/073539
§ 371 (c)(1),
(2), (4) Date: May 11, 2012

(87) PCT Pub. No.: WO2012/056895
PCT Pub. Date: May 3, 2012

(65) Prior Publication Data
US 2012/0229716 A1   Sep. 13, 2012

(30) Foreign Application Priority Data

Oct. 26, 2010   (JP) .................. 2010-239372

(51) Int. Cl.
*G03B 21/14* (2006.01)
*H04N 9/31* (2006.01)
(Continued)

(52) U.S. Cl.
CPC .............. *H04N 9/3155* (2013.01); *G02B 5/005* (2013.01); *G02B 27/0927* (2013.01);
(Continued)

(58) Field of Classification Search
CPC ........ G03B 21/26; G03B 21/14; G03B 27/00; H04N 5/74
USPC .................... 353/89–97; 362/268
See application file for complete search history.

(56) References Cited

U.S. PATENT DOCUMENTS 6,273,569 B1 *   8/2001   Iechika et al. .................. 353/38
6,755,338 B2 *   6/2004   Hahnen et al. ............. 227/175.1
(Continued)

FOREIGN PATENT DOCUMENTS

EP   1890189   2/2008
JP   1995-175016   7/1995
(Continued)

*Primary Examiner* — William C Dowling
*Assistant Examiner* — Jerry Brooks
(74) *Attorney, Agent, or Firm* — Louis Woo (57) ABSTRACT

[Task] It is to provide a projection type display apparatus which enhances the contrast performance while minimizing a reduction in the brightness by blocking a light beam which would decrease the contrast through the use of diaphragms provided in both of an illumination optical system and a projection lens.
[Solution] A light source portion 1 and 2, a first lens array 4, a second lens array 5, and a superposition lens 7 constitute an illumination optical system. An illumination diaphragm 8 located in the vicinity 7 of the second lens array becomes a diaphragm aperture in a rectangular shape when being narrowed, wherein a side of the diaphragm aperture in the rectangular shape and longer side directions of the lens cells of the second lens array 5 are perpendicular or parallel to each other. A liquid crystal display device 17 modulates incident light. A projection lens 19 enlarges and projects modulation light. A projection lens diaphragm 20 becomes a diaphragm aperture in a rhombus shape when being narrowed, wherein a diagonal line of the diaphragm aperture in the rhombus shape and directions of sides of lens cells in a pupil image of the second lens array 5 which is formed in a pupil position of the projection lens are perpendicular or parallel to each other.

8 Claims, 9 Drawing Sheets

(51) Int. Cl.
  *G02B 5/00* (2006.01)
  *G02B 27/09* (2006.01)
  *G02B 27/10* (2006.01)
  *G03B 21/20* (2006.01)
  *G03B 9/02* (2006.01)
  *G03B 21/00* (2006.01)

(52) U.S. Cl.
  CPC ....... *G02B 27/0961* (2013.01); *G02B 27/1026* (2013.01); *G03B 9/02* (2013.01); *G03B 21/208* (2013.01); *G03B 21/2053* (2013.01); *H04N 9/3167* (2013.01); *G03B 21/006* (2013.01)

(56) References Cited

U.S. PATENT DOCUMENTS 6,769,777 B1    8/2004  Dubin et al.
2003/0193650 A1  10/2003  Sugawara
2004/0080722 A1*  4/2004  Yamasaki et al. ............... 353/97
2005/0134181 A1*  6/2005  Jang et al. ..................... 313/636
2005/0179871 A1*  8/2005  Kobayashi et al. ............. 353/31
2006/0050248 A1  3/2006  Koga et al.
2007/0263179 A1  11/2007  Katsuragawa et al.

FOREIGN PATENT DOCUMENTS

| | | |
|---|---|---|
| JP | 2003-302618 | 10/2003 |
| JP | 2005-301069 | 10/2005 |
| JP | 2006-220755 | 8/2006 |
| JP | 2007-079054 | 3/2007 |
| JP | 2007-212159 | 8/2007 |
| JP | 2009-175570 | 8/2009 |
| JP | 2009-288407 | 12/2009 |

\* cited by examiner

ISOLUMINANCE CONTOUR

| ILLUMINATION DIAPHRAGM | PROJECTION LENS DIAPHRAGM | ECCENTRICITY OF FIRST LENS CELL | BRIGHTNESS | CONTRAST |
|---|---|---|---|---|
| OPEN | OPEN | NIL | 100% | 100% |
| OPEN | ◇ | NIL | 56% | 135% |
| ☐ | OPEN | NIL | 47% | 118% |
| ☐ | ◇ | NIL | 40% | 189% |
| ◇ | ◇ | NIL | 50% | 179% |
| ☐ | OPEN | ECCENTRICITY | 48% | 133% |
| OPEN | ◇ | ECCENTRICITY | 57% | 152% |
| ☐ | ◇ | ECCENTRICITY | 41% | 214% |
| ◇ | ◇ | ECCENTRICITY | 51% | 202% |

PROJECTION TYPE DISPLAY APPARATUS

TECHNICAL FIELD

The present invention relates to a projection type display apparatus which displays an image indicated by a liquid crystal display device through an imaging optical system containing a projection lens.

BACKGROUND ART

In a projection type display apparatus, making the contrast higher and making the brightness higher are requested. More light can be taken in as the F values of an illumination optical system and an imaging optical system are smaller so that it tends to be more advantageous in making the brightness higher. On the other hand, a liquid crystal display device and a polarization device such as a polarization beam splitter have incidence angle dependencies respectively so that a displayed image with a higher contrast can be obtained as the incidence angle of a ray of light is smaller, that is, as the F values of an illumination optical system and an imaging optical system are greater.

Accordingly, a projection type display apparatus has been proposed which is designed so that a user can adjust a balance between the contrast and the brightness of a displayed image in accordance with the brightness of use environments. Patent documents 1 disclose that at least one of an illumination optical system and a projection lens is provided with a diaphragm. In addition, the point that two diaphragms are made to interlock is mentioned. Furthermore, patent documents 2 disclose an example in which shading is done by diaphragms provided in an illumination optical system and a projection lens, and disclose an example in which the diaphragm shapes of the diaphragms provided in the illumination optical system and the projection lens are similar figures.

PATENT DOCUMENTS

Patent document 1: Japanese patent application publication number 2003-241311
Patent document 2: Japanese patent application publication number 2005-301069

SUMMARY OF THE INVENTION

Problem to be Solved by the Invention

Characteristics generally required for an optical system are to further improve the contrast while minimizing a reduction in the brightness in view of characteristics of a light source and optical parts. Accordingly, the present invention has an object to provide a projection type display apparatus which enhances the contrast performance while minimizing a reduction in the brightness.

Means for Solving the Problem

In order to solve the above-mentioned problem of the prior art, the present invention provides a projection type display apparatus characterized by comprising a light source portion (1, 2), a first lens array 4 in which a plurality of lens cells are two-dimensionally arranged, a second lens array 5 having a plurality of lens cells corresponding to the previously-mentioned first lens array, a superposition lens 7 superposing an image of the previously-mentioned first lens array on a display surface of a liquid crystal display device, an illumination diaphragm 8 located in the vicinity of the previously-mentioned second lens array and becoming a diaphragm aperture in a rectangular shape when the plurality of the cells in the previously-mentioned second lens array are shaded from a circumference direction wherein a side of the diaphragm aperture in the previously-mentioned rectangular shape and longer side directions of the lens cells of the previously-mentioned second lens array are perpendicular or parallel to each other, the previously-mentioned liquid crystal display device 17 modulating incident light from the previously-mentioned superposition lens, a projection lens 19 enlarging and projecting modulation light emitted from the previously-mentioned liquid crystal display device, and a projection lens diaphragm 20 provided in the vicinity of a pupil of the previously-mentioned projection lens and becoming a diaphragm aperture in a rhombus shape when being narrowed wherein a diagonal line of the diaphragm aperture in the previously-mentioned rhombus shape and directions of sides of lens cells in a pupil image of the second lens array which is formed in a pupil position of the previously-mentioned projection lens are perpendicular or parallel to each other.

In addition, it provides a projection type display apparatus characterized by comprising a light source portion (1, 2), a first lens array (4) in which a plurality of lens cells are two-dimensionally arranged, a second lens array (5) having a plurality of lens cells corresponding to the previously-mentioned first lens array, a superposition lens (7) superposing an image of the previously-mentioned first lens array on a display surface of a liquid crystal display device, an illumination diaphragm (8) located in the vicinity of the previously-mentioned second lens array and becoming a diaphragm aperture in a rhombus shape when the plurality of the cells in the previously-mentioned second lens array are shaded from a circumference direction wherein a diagonal line of the diaphragm aperture in the previously-mentioned rhombus shape and longer side directions of the lens cells of the previously-mentioned second lens array are perpendicular or parallel to each other, the previously-mentioned liquid crystal display device (17) modulating incident light from the previously-mentioned superposition lens, a projection lens (19) enlarging and projecting modulation light emitted from the previously-mentioned liquid crystal display device, and a projection lens diaphragm 20 provided in the vicinity of a pupil of the previously-mentioned projection lens and becoming a diaphragm aperture in a rectangular shape when being narrowed wherein a side of the diaphragm aperture in the previously-mentioned rectangular shape and directions of sides of lens cells in a pupil image of the second lens array which is formed in a pupil position of the previously-mentioned projection lens are perpendicular or parallel to each other.

In the above-mentioned structures, it is preferable that the previously-mentioned light source portion (1, 2) is a light source portion containing a discharge lamp of a two metal cap type and a reflector wherein the line segment connecting two metal caps of the previously-mentioned discharge lamp and the optical axis of the reflector are made in parallel, that a plurality of lens cells among the lens cells in the previously-mentioned first lens array (4) and in the vicinity of an optical axis center are eccentric lens cells (40), that a state of the previously-mentioned illumination diaphragm (8) in which it becomes the diaphragm aperture in the rectangular shape or the rhombus shape is a state where a shading is done from a circumference direction while a plurality of cells in the previously-mentioned second lens array which correspond to the previously-mentioned eccentric lens cells in the previously-mentioned first lens array are left, and that a state of the previously-mentioned projection lens diaphragm (20) in which it becomes the diaphragm aperture in the rhombus shape or the rectangular shape is a state where a shading is done from a circumference direction while lens cell images of the previously-mentioned second lens array in the pupil image of the previously-mentioned second lens array which correspond to the eccentric lens cells in the previously-mentioned first lens array are left.

Furthermore, it is preferable that the eccentricity directions of the previously-mentioned eccentric lens cells (40) are lens outward directions, and an eccentricity ratio is 5%~25%.

Advantage of the Invention

According to the present invention, it is possible to provide a projection type display apparatus which enhances the contrast performance while minimizing a reduction in the brightness.

BRIEF DESCRIPTION OF THE DRAWINGS

[FIG. 2]

[FIG. 8]

[FIG. 9]

MODES FOR CARRYING OUT THE INVENTION

<First Embodiment>

Figure 1:
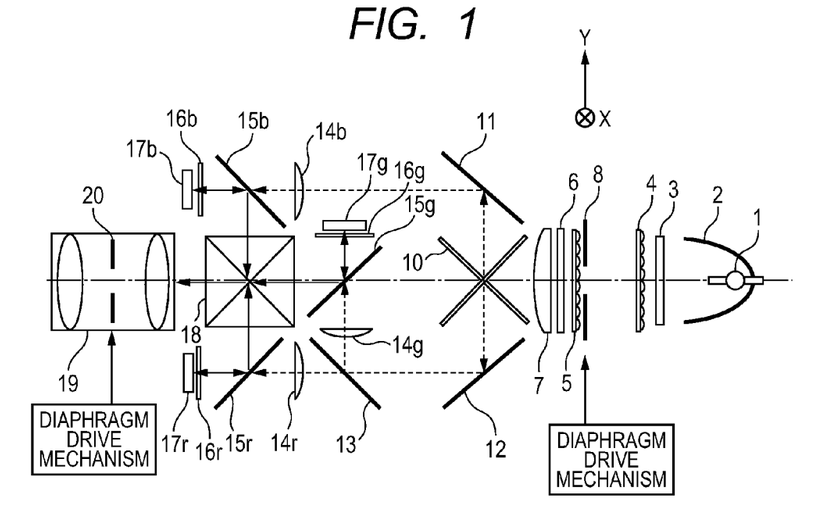
[FIG. 1] It is a structure view of a projection type display apparatus related to a first embodiment.

A projection type display apparatus of the present invention will be explained below with reference to the attached drawings. FIG. 1 is a structure view of a projection type display apparatus related to a first embodiment. As shown in FIG. 1, a light source portion of the projection type display apparatus has a discharge lamp 1 of a two metal cap type, and a reflector 2 reflecting light emitted from the discharge lamp 1 of the two metal cap type toward an optical axis direction. A thing emitting white light such as a high pressure mercury lamp or a metal halide lamp is used for the discharge lamp 1 of the two metal cap type. The reflector 2 has a reflection surface being a paraboloid of revolution for which an optical axis is made as an axis, and reflects light emitted from the discharge lamp 1 at the reflection surface and outputs it as illumination light parallel to the optical axis. The reflector 2 may have a reflection surface being an ellipsoid of revolution for which an optical axis is made as an axis. In this case, an exit side of the reflector is provided with a lens system making the illumination light into approximately parallel light.

Light emitted from the light source portion passes through a cold filter cutting ultraviolet rays and infrared rays, and is incident to a first lens array (fly eye lens) 4. The first lens array 4 is formed by two-dimensionally arranging a plurality of lens cells in a rectangular shape similar to the display areas of reflective liquid crystal display devices 17b, 17g, and 17g being spatial light modulation devices mentioned later so that an opening via which the reflector 2 outputs a beam of light will be spatially divided. The first lens array 4 focuses illumination light on lens cells of a second lens array 5 which correspond to the lens cells of the first lens array 4 respectively, and thereby forms secondary light source images, the number of which is equal to the lens cells of the first lens array 4, on the second lens array 5.

The illumination light which has passed through the first lens array 4 is incident to the second lens array (fly eye lens) 5. With respect to the second lens array 5, each of the lens cells of the second lens array 5 forms an image of a corresponding lens cell aperture of the first lens array 4 on the display surfaces of the reflective liquid crystal display devices 17b, 17g, and 17r.

Between the first lens array 4 and the second lens array 5, there is provided an illumination diaphragm 8. A portion of the light beam of the illumination light is blocked by the illumination diaphragm 8, and thereby the brightness and contrast of an image displayed by the projection type display apparatus can be adjusted. The illumination diaphragm 8 is located in the vicinity of the second lens array 5 on which the secondary light source images are formed. The vicinity of the second lens array 5 is defined as the region between the first lens array 4 and a superposition lens 7 or the region between the superposition lens 7 and a B/RG separation cross dichroic mirror 10.

As shown in FIG. 1, the illumination light emitted from the second lens array 5 is incident to a polarization converting device 6. The polarization converting device 6 is an optical device formed in a flat plate shape in which a plurality of polarization beam splitters are arranged in parallel, and has the function of converting incident light having random polarization directions into polarized light having a fixed polarization direction. Thus, polarized light having a fixed polarization direction is emitted from the polarization converting device 6.

The polarized light (set as P polarized light in the present embodiment) emitted from the polarization converting device 6 is incident to the superposition lens 7. The superposition lens 7 operates to make the centers of the images of the respective lens cells of the first lens array 4 coincident with the centers of the reflective liquid crystal display devices 17b, 17g, and 17r so that the images of the respective lens cells of the first lens array 4 will overlap on the display surfaces of the reflective liquid crystal display devices 17b, 17g, and 17r.

The P polarized light emitted from the superposition lens 7 is separated by the B/RG separation cross dichroic mirror 10 into blue light and red•green light. The blue light is bent in optical path by a B mirror 11, and passes through a field lens 14b for blue, a WG-PBS 15b for blue, and a wave plate 16b for blue before being incident to the liquid crystal display device 17b for blue. An S polarized light component reflected and modulated by the liquid crystal display device 17b for blue is reflected by the WG-PBS 15b for blue, and travels toward a cross dichroic prism 18.

The red•green light separated by the B/RG separation cross dichroic mirror 10 is bent in optical path by an RG mirror 12, and is separated into red light and green light by an RG dichroic mirror 13. Similar to the case of the blue light, the red light and the green light pass through field lenses 14r and 14g, WG-PBSs 15r and 15g, and wave plates 16r and 16g before being incident to the reflective liquid crystal display devices 17r and 17g, respectively. S polarized light components reflected and modulated by the reflective liquid crystal display devices 17r and 17g are reflected by the WG-PBSs 15r and 15g, and travel toward the cross dichroic prism 18. The 3-color lights are combined in the cross dichroic prism 18, and are projected by a projection lens 19 onto a screen.

Figure 2:
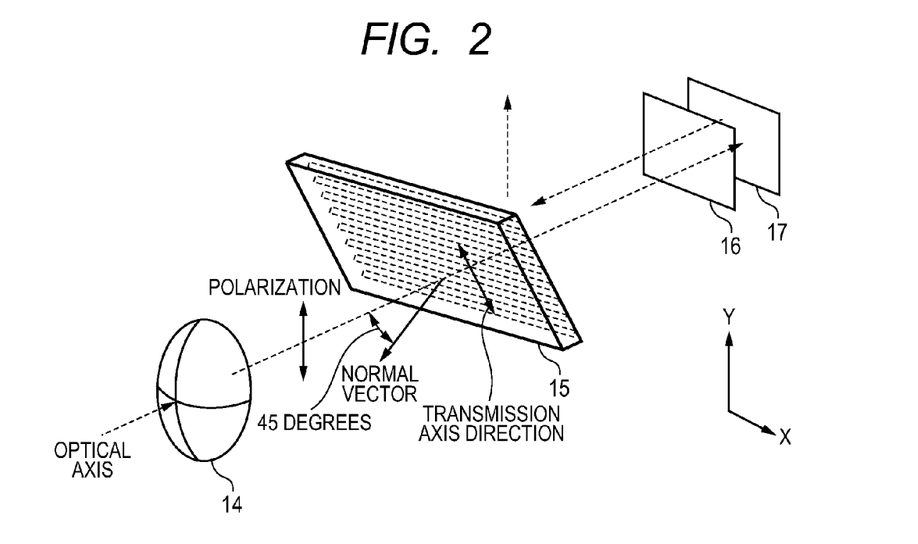
FIG. 2 is an explanation view showing an optical path extending to a field lens 14, a WG-PBS 15, a wave plate 16, and a reflective liquid crystal display device 17.

FIG. 2 is an explanation view showing an optical path extending to a field lens 14, a WG-PBS 15, a wave plate 16, and a reflective liquid crystal display device 17. The wave plate 16 and the reflective liquid crystal display device 17 are placed at a right angle with respect to an optical axis. The WG-PBS 15 is a wire grid type polarization beam splitter in which metal is formed in a grid shape on a glass substrate, and is inclined at an angle of 45 degrees with respect to the optical axis. A direction perpendicular to the direction of the wire grid is a transmission axis direction in which polarized light is transmitted. The light which has passed through the WG-PBS 15 is incident to the wave plate 16 and the reflective liquid crystal display device 17.

Figure 3:
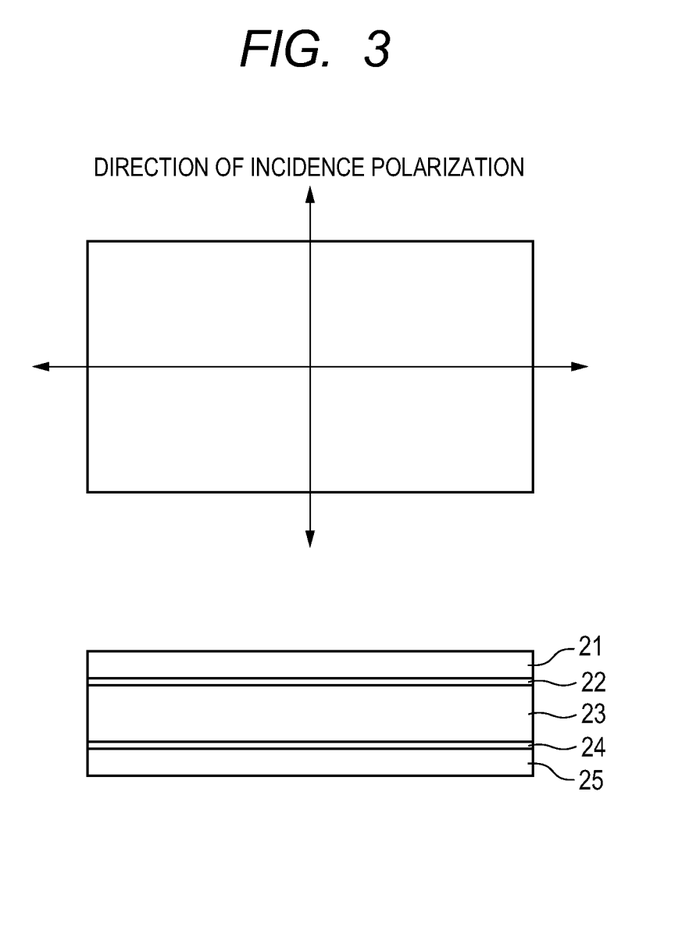
[FIG. 3] It is a view showing the structure of the reflective liquid crystal display device 17.

FIG. 3 is a view showing the structure of the reflective liquid crystal display device 17. The reflective liquid crystal display device 17 is formed by arranging a transparent substrate 21 formed at its surface with transparent electrodes and an active matrix substrate 25 in which reflecting electrodes for respective pixels are arranged in a matrix in a manner such that the transparent electrodes and the reflecting electrodes will face and be opposed to each other. A transparent electrode side is a light entrance side. Nematic liquid crystal having a negative dielectric anisotropy is fluid-tightly placed between the transparent electrodes and the reflecting electrodes in a manner such as to be given a prescribed pretilt angle. Surfaces at liquid crystal layer 23 sides in the transparent substrate 21 and the active matrix substrate 25 are provided with alignment films 22 and 24.

Figure 4:
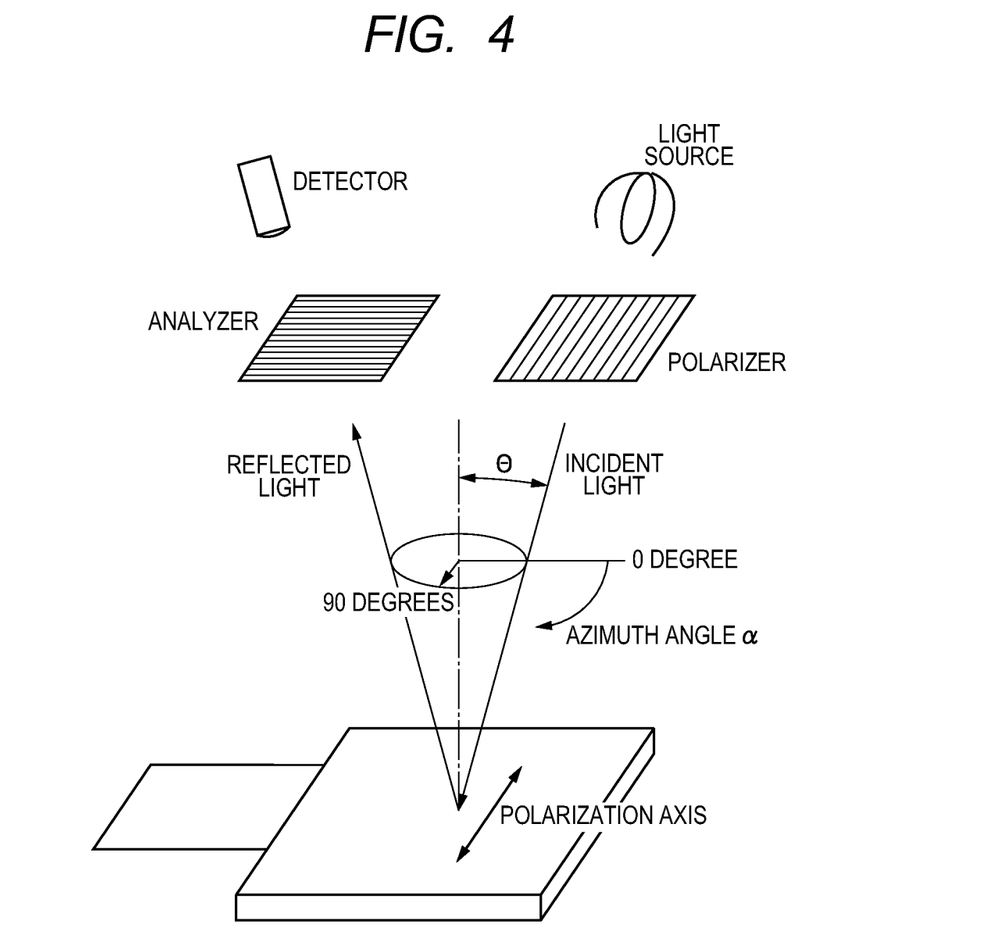
[FIG. 4] It is a view showing a method of measuring the relation between the black level in indication by the reflective liquid crystal display device 17 and the azimuth (the in-plane observation angle).
Figure 5:
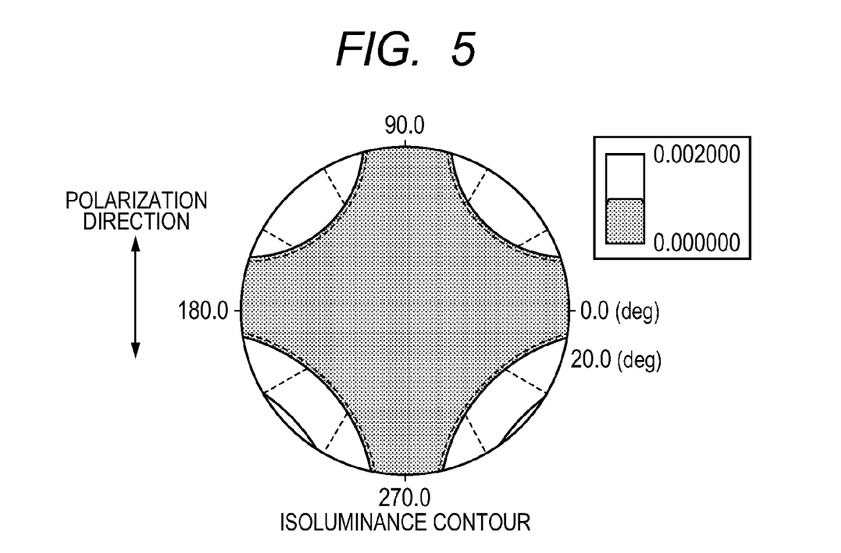
[FIG. 5] It is a view showing the relation between the black level in indication by the reflective liquid crystal display device 17 and the azimuth (the in-plane observation angle) which is measured by the measurement method in FIG. 4.

FIG. 4 is a view showing a method of measuring the relation between the black level in indication by the reflective liquid crystal display device 17 and the azimuth (the in-plane observation angle). FIG. 5 is a view showing the relation between the black level in indication by the reflective liquid crystal display device 17 and the azimuth (the in-plane observation angle) which is measured by the measurement method in FIG. 4. In FIG. 4, the incident light from the light source is incident to the reflective liquid crystal display device 17 via a polarizer, and passes through the liquid crystal layer 23 and is reflected by the reflecting electrodes before passing through the liquid crystal layer 23 again and being emitted to the outside with respect to the reflective liquid crystal display device 17. The emitted light is subjected to photometry by a detector via an analyzer. The polarizer and the analyzer are set in a relation of crossed Nicols. In FIG. 5, the white portions in the circle denote conditions where leak light is great and the contrast of the reflective liquid crystal display device 17 is low, and the black portions denote conditions where leak light is little and the contrast of the reflective liquid crystal display device 17 is high.

Normally, in the reflective liquid crystal display device 17, an incidence polarization direction is set to a direction shown in FIG. 2 and FIG. 3. Pictures of three reflective liquid crystal display devices are combined. For reasons being the above-mentioned two points, most of reflective liquid crystal display devices have contrast characteristics approximately symmetrical with respect to an incidence polarization direction as shown in FIG. 5. In 4 directions at 90-degree intervals that contain the transmission axis direction of the WG-PBS 15, the black level of indication by the reflective liquid crystal display device 17 is low and the contrast is high. In 4 directions forming angles of 45 degrees with respect to the transmission axis direction of the WG-PBS 15, the black level of indication becomes high. For similar reasons, a transmissive liquid crystal display device has contrast characteristics approximately symmetrical with respect to an incidence polarization direction of the transmissive liquid crystal display device.

Figure 6:
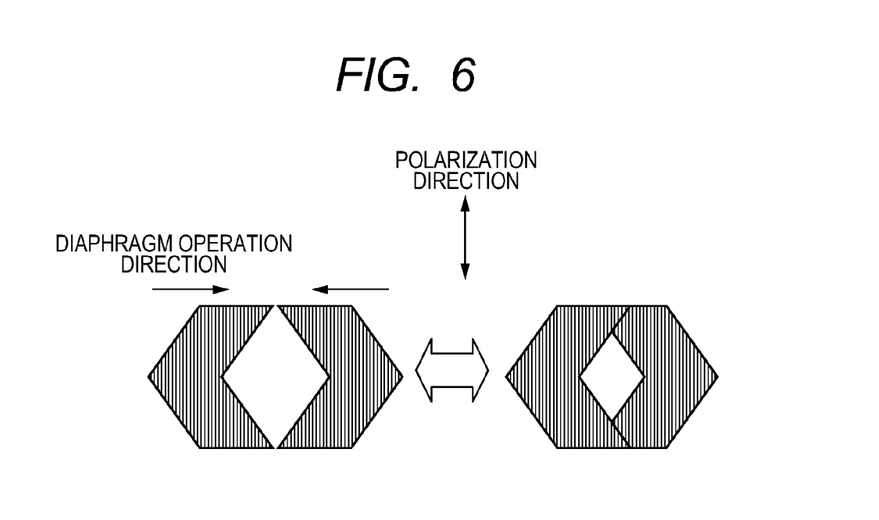
[FIG. 6] It is a view diagrammatically showing a projection lens diaphragm 20 provided in a projection lens 19.

FIG. 6 is a view diagrammatically showing a projection lens diaphragm 20 provided in a projection lens 19. In the case where the diaphragm is open, the light incident to the projection lens 19 is not blocked by the projection lens diaphragm 20. As shown in the right portion of FIG. 6, by narrowing the projection lens diaphragm 20, the projection lens diaphragm 20 has the conditions that the shape of the diaphragm aperture becomes rhombic. The diaphragm aperture shape occurring at that time is a rhombus shape such that the incidence polarization direction of the reflective liquid crystal display device 17 is a diagonal. By narrowing the projection lens diaphragm 20 toward a rhombus shape, light being a high angle component with a low contrast in view angle characteristics of the reflective liquid crystal display device 17 can be preferentially blocked and hence it is possible to obtain the advantage that the contrast is increased while a reduction in amount of light is suppressed. In the first embodiment, a rhombus is defined as containing conditions where 4 angles of the rhombus are equal, that is, a square in which a diagonal line is in the incidence polarization direction of the reflective liquid crystal display device 17.

Figure 7:
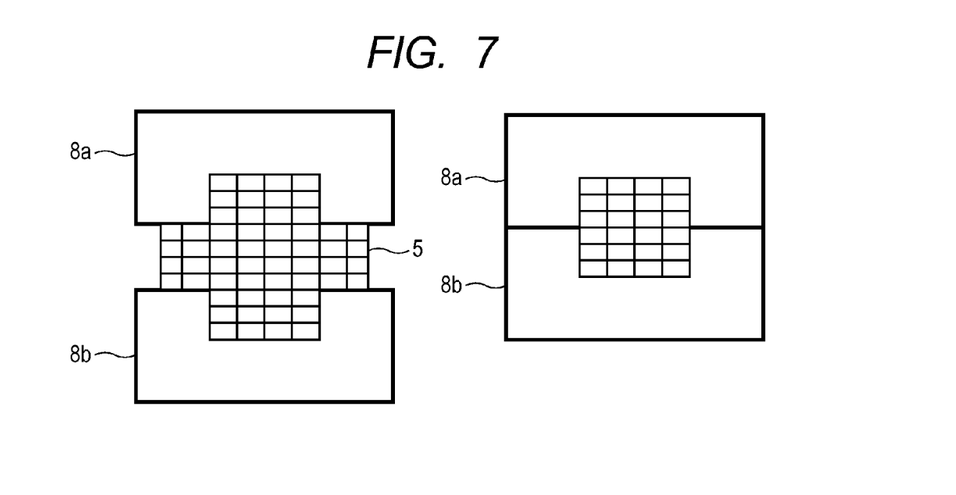
[FIG. 7] It is a front view showing the positional relation between an illumination diaphragm 8 and a second lens array 5.

FIG. 7 is a front view showing the positional relation between the illumination diaphragm 8 and the second lens array 5. As shown in FIG. 1 and FIG. 7, the illumination diaphragm 8 is designed so that two shading plates 8a and 8b which block portions of a beam of light in the vicinity of the second lens array 5 can be moved and operated. By moving the two shading plates 8a and 8b, the contrast and brightness of an indicated image can be adjusted.

By narrowing the illumination diaphragm 8, the illumination diaphragm 8 has the conditions that the shape of the diaphragm aperture becomes rectangular. The diaphragm aperture shape occurring at that time is a rectangular shape, and the sides of the rectangular shape are parallel to the sides of the lens cells, that is, the sides of the reflective liquid crystal display device 17. Thus, the sides of the rectangular shape of the illumination diaphragm 8 are parallel or perpendicular to a diagonal line of the rhombus shape of the diaphragm aperture of the projection lens diaphragm 20.

Figure 8:
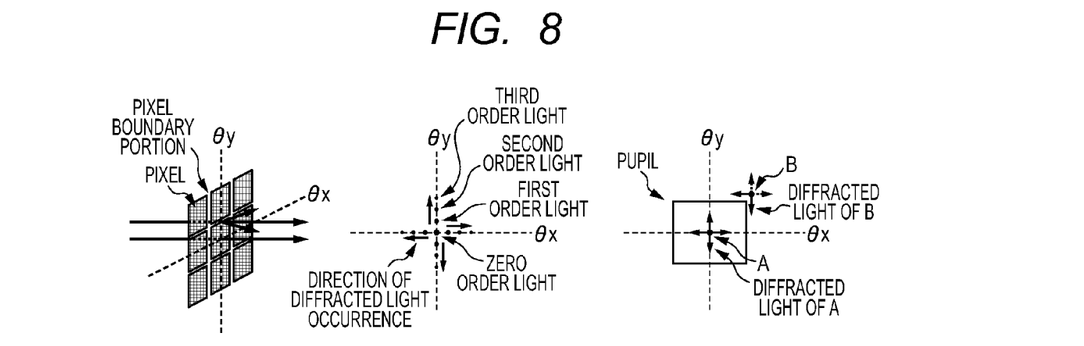
FIG. 8 is a view for explaining a diffraction phenomenon of a liquid crystal display device.

FIG. 8 is a view for explaining a diffraction phenomenon of a liquid crystal display device. A diffraction phenomenon of a liquid crystal display device is a phenomenon occurring in a transmissive liquid crystal display device and a reflective liquid crystal display device 17 in common. In the transmissive liquid crystal display device, the areas between pixels are shielded by masks. In the reflective liquid crystal display device 17, while they are not shielded by masks, there are regions different from pixels between plural pixel electrodes. The shading regions in the transmissive liquid crystal display device and the regions different from pixels in the reflective liquid crystal display device 17 are expressed as pixel boundary portions in FIG. 6. In FIG. 6, it is expressed so that light is incident to the pixel boundary portions while being in a transmissive mode. The light incident to these liquid crystal display devices are subjected to modulation by the liquid crystals, and are transmitted or reflected. A diffraction phenomenon occurs at that time since they have the structures where a plurality of pixels are periodically arranged.

As in FIG. 8, the angular coordinate axes parallel and perpendicular to the pixel boundary portions are labeled as $\theta x$ and $\theta y$. In the case where light A with a small angle and a high contrast and light B with a great angle and a low contrast are incident to the pixel boundary portions, diffracted light occurs in the $\theta x$ and $\theta y$ directions for each of the light A and the light B. Since the diffracted light is disordered in polarization direction with respect to the incident light, it becomes a component deteriorating the contrast. It was made clear that even if the liquid crystal portions with a low contrast are shielded by use of the rhombic projection lens diaphragm 20, a further improvement of the contrast can not be expected in the absence of the suppression of a contrast reduction caused by the diffracted light.

Figure 9:
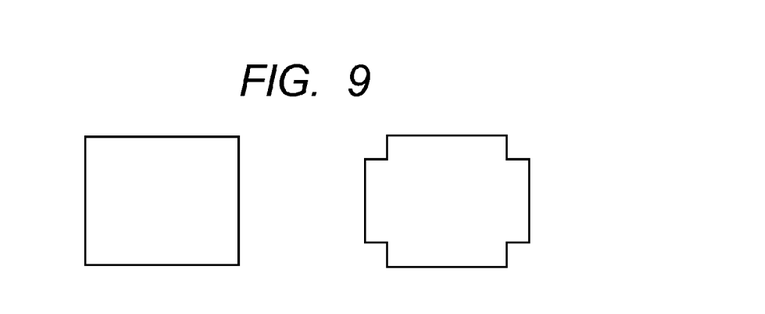
FIG. 9 is an example showing a diaphragm aperture in the illumination diaphragm 8.

Accordingly, the illumination diaphragm 8 is provided also in the illumination optical system to suppress a contrast reduction caused by the diffracted light. Regarding the illumination diaphragm 8 in the illumination optical system, it is preferable that the boundary line of the diaphragm is in the direction of the diffracted light, that is, the direction horizontal or vertical with respect to the pixel boundary direction, and is preferable that the aperture takes a rectangular shape as shown in FIG. 7. FIG. 9 is an example showing the shape of a diaphragm aperture in the illumination diaphragm 8. It is preferable that the shape of the diaphragm aperture in the illumination diaphragm 8 is a rectangular shape as shown in the left side drawing in FIG. 9. In order to shield cells at the four corners which are worse in view angle characteristics than the basic rectangular shape, it may be a shape such that four corner portions of the rectangular shape extend into the inside as shown in the right side drawing in FIG. 9.

Figure 10:
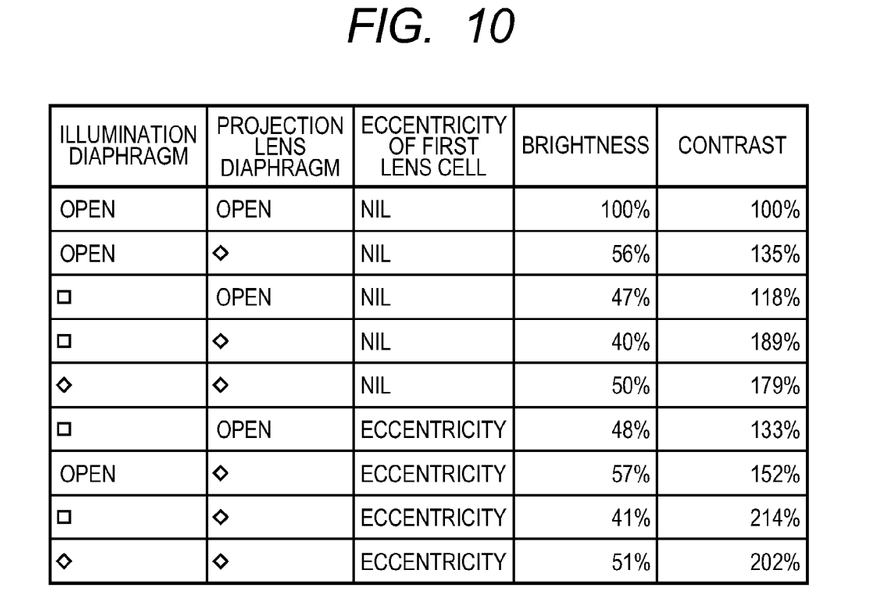
[FIG. 10] It is a view showing the relation among the contrast, the brightness, and the presence and absence of operation of the illumination diaphragm 8 and the projection lens diaphragm 20.

FIG. 10 is a view showing the relation among the contrast of the projection type display apparatus, the brightness and the presence and absence of operation of the illumination diaphragm 8 and the projection lens diaphragm 20. FIG. 10 shows variations in the contrast and the brightness which occur in the case where the brightness and the contrast are set to 100% under the conditions that both the illumination diaphragm 8 and the projection lens diaphragm 20 are opened, the case where the projection lens diaphragm 20 is narrowed into the rhombus, and the case where the illumination diaphragm 8 is narrowed into the rectangle or the rhombus.

Even when the projection lens diaphragm 20 is narrowed or even when the illumination diaphragm 8 is narrowed, the contrast of the projection type display apparatus increases. When both the projection lens diaphragm 20 and the illumination diaphragm 8 are used, the contrast increases further and a reduction in the brightness is not so considerable. In the case where a contrast comparison is made under the conditions that the projection lens diaphragm 20 is fixed in the rhombus and the illumination diaphragm 8 is made rectangular and rhombic, the rectangular illumination diaphragm 8 causes an increase in the contrast by about 10%. This is thought to result from the fact that the above-mentioned advantage obtained by blocking the diffracted light appears.

According to the above consequence, performing the narrowing while interlocking the narrowing operation of the illumination diaphragm 8 and the narrowing operation of the projection lens diaphragm 20, and providing the conditions where the shape of the illumination diaphragm 8 is made a rectangular shape and the conditions where the shape of the projection lens diaphragm 20 is made a rhombus shape are more effective in a point of contrast. Specifically, a same control circuit synchronously narrows the illumination diaphragm 8 and the projection lens diaphragm 20. Alternatively, separate control circuits synchronously narrow the illumination diaphragm 8 and the projection lens diaphragm 20 in response to a same command.

In the case where the projection lens diaphragm 20 is made in a rectangular shape and the illumination diaphragm 8 is made in a rhombus shape, the contrast can be enhanced similarly. The reason for it is that the pupil positions of the projection lens 19 and the second lens array 5 are in an optical conjugate relation.

Figure 11:
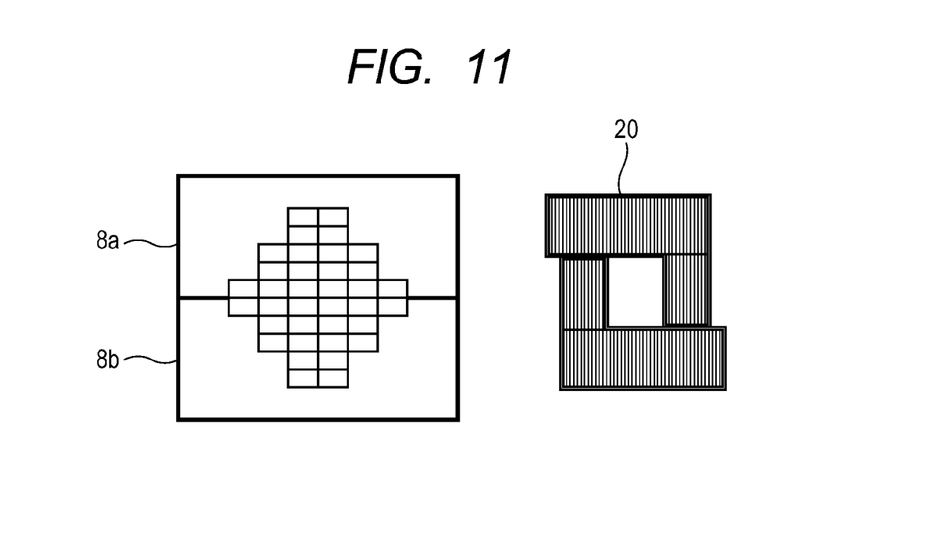
[FIG. 11] It is a view diagrammatically showing the shapes of the two diaphragms which occur in the case where the projection lens diaphragm 20 is made in a rectangular shape and the illumination diaphragm 8 is made in a rhombus shape.

FIG. 11 is a view diagrammatically showing the shapes of the two diaphragms which occur in the case where the projection lens diaphragm 20 is made in a rectangular shape and the illumination diaphragm 8 is made in a rhombus shape. As a matter to be attended to in the case of making the illumination diaphragm 8 in a rhombus shape, it is necessary that the aperture of the illumination diaphragm 8 will not cross the lens cells of a lens array. In the case where shading is done while crossing a lens cell, incident light for that lens cell is partially blocked. Since such a cell illuminates only a portion of a rectangular image surface of the reflective liquid crystal display device 17, it causes unevenness in brightness on the screen. By providing a diaphragm shape being a shape accorded with a ridgeline of each cell as in the left drawing in FIG. 11, the above-mentioned evil can be removed. Narrowing the illumination diaphragm 8 and the projection lens diaphragm 20 while interlocking them, and providing the conditions where the shape of the illumination diaphragm 8 is made a rhombus shape and the conditions where the shape of the projection lens diaphragm 20 is made a rectangular shape are more effective in a point of contrast. Specifically, a same control circuit synchronously narrows the illumination diaphragm 8 and the projection lens diaphragm 20. Alternatively, separate control circuits synchronously narrow the illumination diaphragm 8 and the projection lens diaphragm 20 in response to a same command.

<Second Embodiment>

Figure 12:
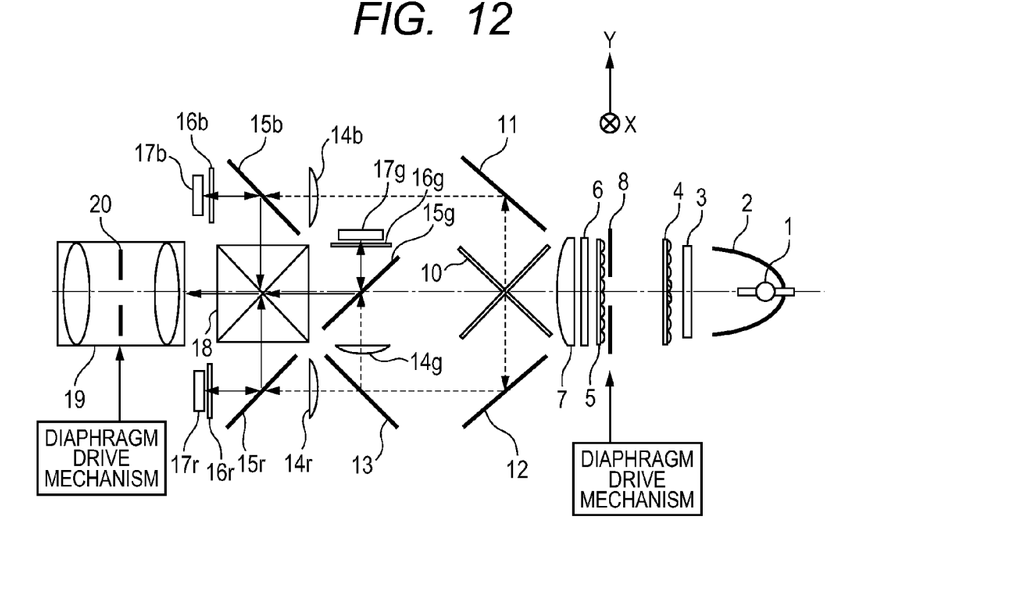
[FIG. 12] It is a view showing a projection type display apparatus related to a second embodiment.

FIG. 12 is a view showing a projection type display apparatus related to a second embodiment. It is the approximately same in structure as the projection type display apparatus related to the first embodiment which is shown in FIG. 1. A rhombus is defined as containing conditions where 4 angles of the rhombus are equal, that is, a square in which a diagonal line is in an incidence polarization direction of the reflective liquid crystal display device 17 in the second embodiment also. A point of difference from the projection type display apparatus related to the first embodiment is the point that some lens cells in the first lens array 4 are made lens cells of an eccentric type.

Figure 13:
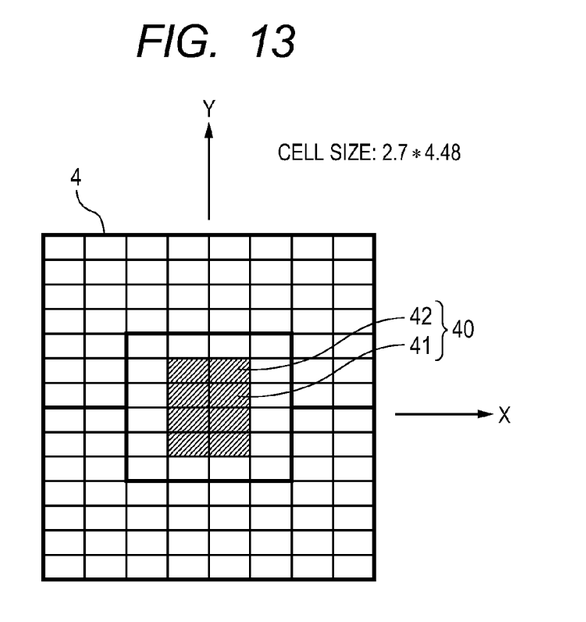
[FIG. 13] It is a view showing a first lens array 4 related to the second embodiment.
Figure 14:
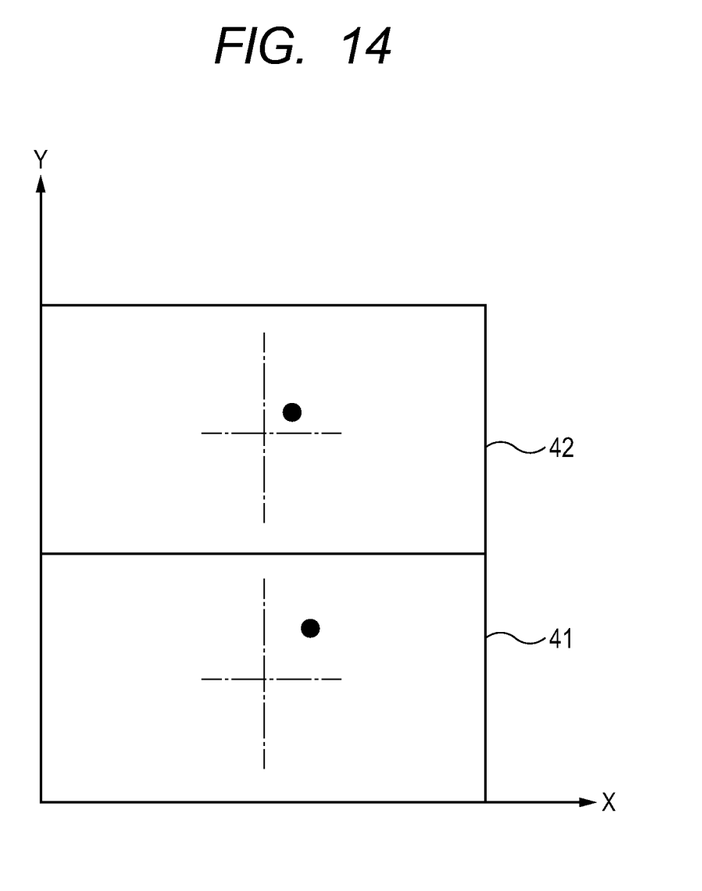
[FIG. 14] It is a view showing the conditions of an eccentricity of the first lens array 4 related to the second embodiment.

FIG. 13 is a view showing a first lens array 4 related to the second embodiment. Eight cells at the center of the first lens array 4 are made eccentric lens cells 40. An eccentric lens cell means a lens cell of a lens array and a lens cell in which the center of curvature of a convex lens forming the lens cell is not at the center of the lens cell and is eccentric. FIG. 14 is a view showing the conditions of an eccentricity of the first lens array 4 related to the second embodiment. The first lens array 4 in the present embodiment has axial symmetry in up, down, left, and right with respect to the XY axes, and FIG. 14 shows eccentric lens cells in the first quadrant only.

The size of each of the lens cells forming the first lens array 4 is set to be 4.48 mm in lengthwise direction and 2.7 mm in widthwise direction. The degree of eccentricity of an eccentric lens cell is defined as follows. The eccentricity degree is defined as being 0% in the case where the convex lens center is at the rectangle center of a lens cell, and the eccentricity degree is defined as being 100% in the case where the convex lens center is at the periphery of the rectangle of a lens cell. Regarding the lens cell 41 in FIG. 14, there is an eccentricity toward a lens outer side such that 0.5 mm/2.24 mm=22% in the x axis direction (the lengthwise direction of the lens cell), and 0.3 mm/1.35 mm=22% in the y axis direction (the widthwise direction of the lens cell). Regarding the lens cell 42 in FIG. 14, there is an eccentricity toward a lens outer side such that 0.3 mm/2.24 mm=13% in the x axis direction (the lengthwise direction of the lens cell), and 0.1 mm/1.35 mm=7.4% in the y axis direction (the widthwise direction of the lens cell). As above, it is preferable that the direction of eccentricity of an eccentric lens along each of the X and Y axes is a lens outward direction, and the degree of eccentricity is 5%~25%.

Figure 15:
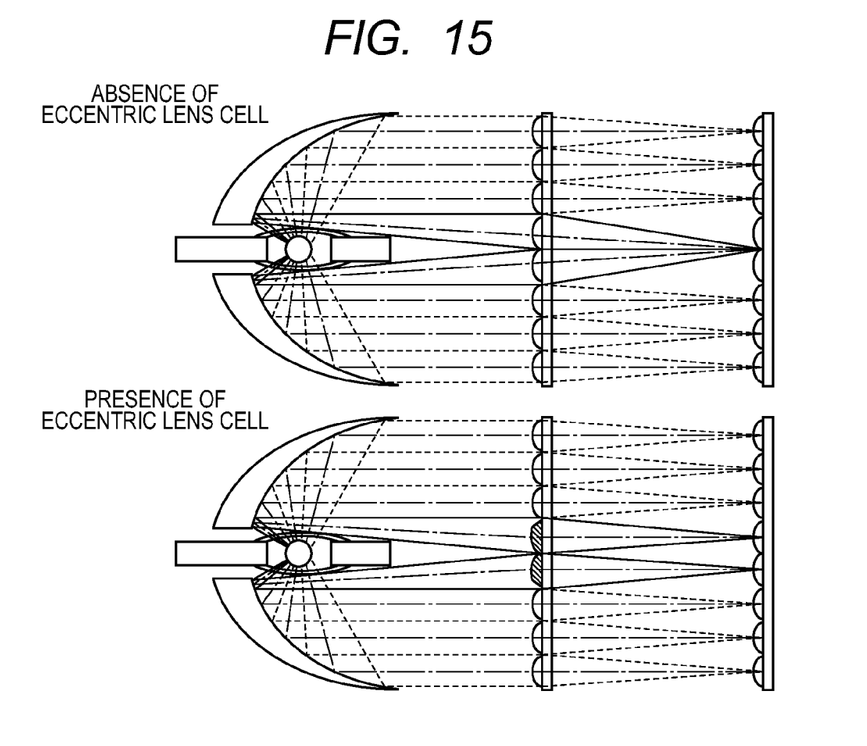
[FIG. 15] It is a view for explaining the advantage of an eccentric lens cell.

FIG. 15 is a view for explaining the advantage of an eccentric lens cell 40. In an ideal state, light reflected at the reflector 2 of the discharge lamp is incident to the first lens array 4 as parallel light, and forms an image at the second lens array 5 as a secondary light source image. In fact, regarding light incident to a cell at the center of the first lens array 4, light parallel to the optical axis is absent due to the presence of a hole in the reflector 2 and vignetting by the metal cap at the reflector exit side, and there is only light having an angle with respect to the optical axis. Therefore, the light in the lens cell at the center of the first lens array 4 could not form a secondary light source image at the corresponding lens array center of the second lens array 5, and the light which reached the reflective liquid crystal display device 17 and contributed to the illumination was little. The light in a state where the illumination diaphragm 8 was narrowed was great in F value and must be a component advantageous to the contrast but the rate of the component was low, and hence there was a defect such that it was difficult to obtain a desired contrast. Thus, by making the convex lens centers of 8 cells at and around the center of the first lens array 4 eccentric toward the outer side, it is made possible that the secondary light source image by the central portion of the first lens array 4 is image-formed at the second lens array 5.

FIG. 10 also shows the relation among the contrast of the projection type display apparatus, the brightness and the presence and absence of operation of the illumination diaphragm 8 and the projection lens diaphragm 20 which occurs in the case of a lens array having an eccentric lens cell 40. In the case of the presence of an eccentric lens cell relative to the absence of an eccentric lens cell, the brightness increases by about 2% and the contrast increases by about 13% when the states of the two diaphragms are made in the same conditions. The degrees of increase in the brightness and the contrast are approximately constant regardless of the sates of the two diaphragms.

Making the illumination diaphragm 8 in a rectangular shape and making the projection lens diaphragm 20 in a rhombus shape are effective in the second embodiment also. Performing the narrowing while interlocking the narrowing operation of the illumination diaphragm 8 and the narrowing operation of the projection lens diaphragm 20, and providing the conditions where the shape of the illumination diaphragm 8 is made a rectangular shape and the conditions where the shape of the projection lens diaphragm 20 is made a rhombus shape are more effective in a point of contrast. Specifically, a same control circuit synchronously narrows the illumination diaphragm 8 and the projection lens diaphragm 20. Alternatively, separate control circuits synchronously narrow the illumination diaphragm 8 and the projection lens diaphragm 20 in response to a same command.

Figure 16:
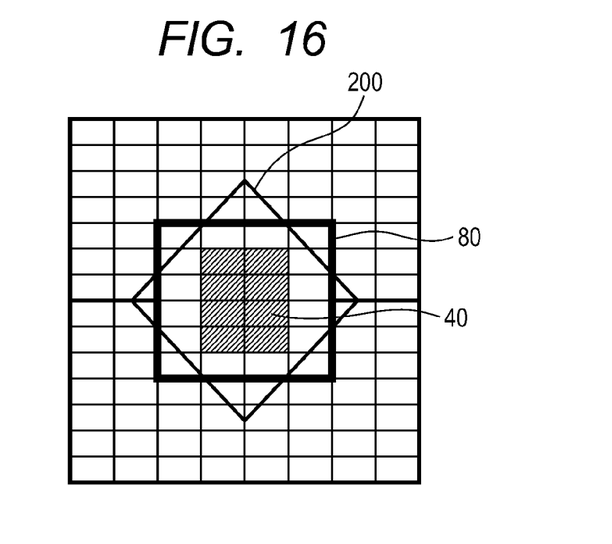
[FIG. 16] It is a view showing the relation between eccentric lens cells and the diaphragm apertures in the illumination diaphragm 8 and the projection lens diaphragm 20.

FIG. 16 is a view showing the relation among eccentric lens cells 40, the diaphragm aperture 200 in the projection lens diaphragm 20, and the diaphragm aperture 80 in the illumination diaphragm 8. As shown in FIG. 16, regarding the illumination diaphragm 8, peripheral portions of the second lens array 5 are shaded by shading plates 8a and 8b in a manner such that lens cells in the second lens array 5 which correspond to eccentric lens cells in the first lens array 4 are left. The diaphragm aperture which occurs when the narrowing is done is rectangular.

The position of a pupil of the projection lens 19 is conjugate with respect to the second lens array 5, and an image of a pupil of the second lens array 5 is formed at the position of the pupil of the projection lens 19. The projection lens diaphragm 20 has a state where shielding is done from a circumference direction to cause a diaphragm aperture in a rhombus shape while in the image of the pupil of the second lens array 5, images of pupils of lens cells in the second lens array 5 which correspond to the eccentric lens cells 40 in the first lens array 4 are left. With respect to the projection lens diaphragm 20, there are shown lens cells of the second lens array 5 depicted in FIG. 16 as pupil images thereof. In the case where the diaphragm aperture in the illumination diaphragm 8 is in a rhombus shape and the diaphragm aperture in the projection lens diaphragm 20 is in a rectangular shape, there is a similar relation with the eccentric lens cells.

In the case where the diaphragm aperture at the time of narrowing the projection lens diaphragm 20 is made in a rectangular shape and the diaphragm aperture at the time of narrowing the illumination diaphragm 8 is made in a rhombus shape, the contrast can be enhanced similarly to the case of the first embodiment. Narrowing the illumination diaphragm 8 and the projection lens diaphragm 20 while interlocking them, and providing the conditions where the shape of the illumination diaphragm 8 is made a rhombus shape and the conditions where the shape of the projection lens diaphragm 20 is made a rectangular shape are more effective in a point of contrast. Specifically, a same control circuit synchronously narrows the illumination diaphragm 8 and the projection lens diaphragm 20. Alternatively, separate control circuits synchronously narrow the illumination diaphragm 8 and the projection lens diaphragm 20 in response to a same command.

In the above, a description has been made while the reflective liquid crystal display device 17 is taken as an example. In the case where a transmissive liquid crystal display device is used, the contrast of a projection type display apparatus can be enhanced by providing an illumination diaphragm 8 and a projection lens diaphragm 20, and making one of the shapes of them a rectangular shape and making the other shape a rhombus shape also. Similarly, it is possible to obtain the advantage caused by using eccentric lens cells.

EXPLANATION OF CHARACTERS 1 discharge lamp, 2 reflector, 3 cold filter, 4 first lens array, 5 second lens array, 6 polarization converting device, 7 superposition lens, 8 illumination diaphragm, 10 B/RG separation cross dichroic mirror, 11 B mirror, 12 RG mirror, 13 RG dichroic mirror, 14r field lens for red, 14g field lens for green, 14b field lens for blue, 15r WG-PBS for red, 15g WG-PBS for green, 15b WG-PBS for blue, 16r wave plate for red, 16g wave plate for green, 16b wave plate for blue, 17r liquid crystal display device for red, 17g liquid crystal display device for green, 17b liquid crystal display device for blue, 18 cross dichroic prism, 19 projection lens, 20 projection lens diaphragm, 21 transparent substrate, 22, 24 alignment films, 23 liquid crystal layer, 25 active matrix substrate, 40, 41, 42 eccentric lens cells

The invention claimed is:

1. A projection type display apparatus comprising:
a light source portion;
a first lens array in which a plurality of lens cells are two-dimensionally arranged;
a second lens array having a plurality of lens cells corresponding to the first lens array;
a superposition lens adapted to superimpose an image of the first lens array on a display surface of a liquid crystal display device, which is adapted to modulate incident light from the superposition lens;
an illumination diaphragm located in the vicinity of the second lens array and adapted to form a diaphragm aperture in a rectangular shape when the plurality of the cells in the second lens array are shaded in a linear or straight direction, wherein a side of the diaphragm aperture in the rectangular shape is in the direction of diffracted light of the liquid crystal display device and is perpendicular or parallel to longer side directions of the lens cells of the second lens array;
a projection lens adapted to enlarge and project modulation light emitted from the liquid crystal display device; and
a projection lens diaphragm provided in the vicinity of a pupil of the projection lens and adapted to form a diaphragm aperture in a rhombus shape when being narrowed wherein a diagonal line of the diaphragm aperture in the rhombus shape and directions of sides of lens cells in a pupil image of the second lens array which is formed in a pupil position of the projection lens are perpendicular or parallel to each other.

2. A projection type display apparatus comprising:
a light source portion;
a first lens array in which a plurality of lens cells are two-dimensionally arranged;
a second lens array having a plurality of lens cells corresponding to the first lens array;
a superposition lens adapted to superpose an image of the first lens array on a display surface of a liquid crystal display device adapted to modulate incident light from the superposition lens;
an illumination diaphragm located in the vicinity of the second lens array and adapted to form a diaphragm aperture in a rhombus shape when the plurality of the cells in the second lens array are shaded in a linear or straight direction, wherein a diagonal line of the diaphragm aperture in the rhombus shape and longer side directions of the lens cells of the second lens array are perpendicular or parallel to each other;
a projection lens adapted to enlarge and project modulation light emitted from the liquid crystal display device; and
a projection lens diaphragm provided in the vicinity of a pupil of the projection lens and adapted to form a diaphragm aperture in a rectangular shape when being narrowed, wherein a side of the diaphragm aperture in the rectangular shape is in the direction of diffracted light of the crystal display device and is perpendicular or parallel to directions of sides of lens cells in a pupil image of the second lens array which is formed in a pupil position of the projection lens.

3. The projection type display apparatus of claim 1, wherein:
the light source portion is a light source portion containing a discharge lamp of a two metal cap type and a reflector wherein the line segment connecting two metal caps of the discharge lamp and the optical axis of the reflector are made in parallel;
a plurality of lens cells among the lens cells in the first lens array and in the vicinity of an optical axis center are eccentric lens cells;
a state of the illumination diaphragm in which it forms the diaphragm aperture in the rectangular shape or the rhombus shape is a state where a shading is done from a linear or straight direction while a plurality of cells in the second lens array which correspond to the eccentric lens cells in the first lens array are left; and
a state of the projection lens diaphragm in which it forms the diaphragm aperture in the rhombus shape or the rectangular shape is a state where a shading is done from a linear or straight direction while lens cell images of the second lens array in the pupil image of the second lens array which correspond to the eccentric lens cells in the first lens array are left.

4. The projection type display apparatus of claim 3, wherein the eccentricity directions of the eccentric lens are lens outward directions, and an eccentricity ratio is 5%~25%.

5. The projection type display apparatus of claim 2, wherein:
the light source portion is a light source portion containing a discharge lamp of a two metal cap type and a reflector wherein the line segment connecting two metal caps of the discharge lamp and the optical axis of the reflector are made in parallel;
a plurality of lens cells among the lens cells in the first lens array and in the vicinity of an optical axis center are eccentric lens cells;
a state of the illumination diaphragm in which it forms the diaphragm aperture in the rectangular shape or the rhombus shape is a state where a shading is done from a linear or straight direction while a plurality of cells in the second lens array which correspond to the eccentric lens cells in the first lens array are left; and
a state of the projection lens diaphragm in which it forms the diaphragm aperture in the rhombus shape or the rectangular shape is a state where a shading is done from a linear or straight direction while lens cell images of the second lens array in the pupil image of the second lens array which correspond to the eccentric lens cells in the first lens array are left.

6. The projection type display apparatus of claim 5, wherein the eccentricity directions of the eccentric lens are lens outward directions, and an eccentricity ratio is 5%~25%.

7. The projection type display apparatus of claim 1, further comprising means for synchronously moving the illumination diaphragm and the projection lens diaphragm.

8. The projection type display apparatus of claim 2, further comprising means for synchronously moving the illumination diaphragm and the projection lens diaphragm.

* * * * *